May 31, 1949.  E. M. DELORAINE ET AL  2,471,416
RADIO COMMUNICATING SYSTEM
Filed March 28, 1946  3 Sheets-Sheet 1
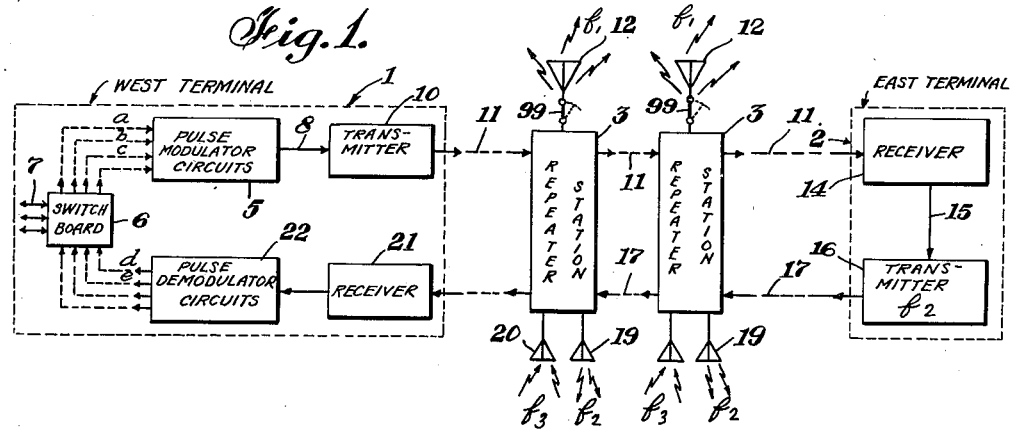
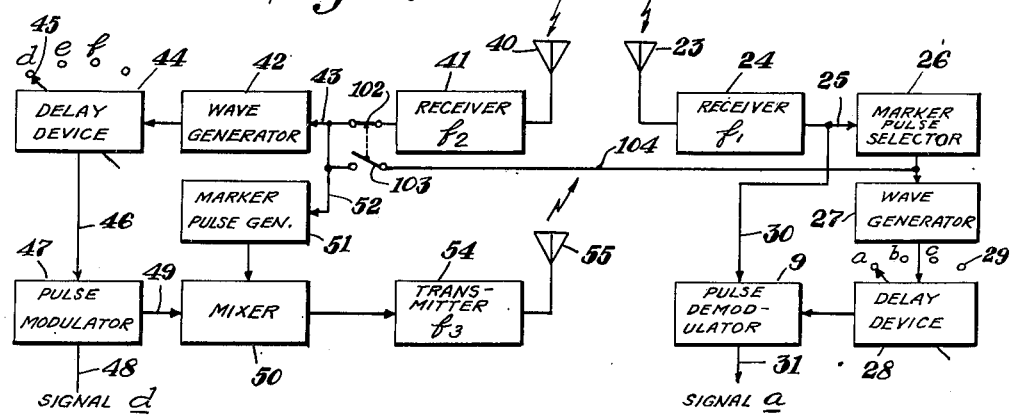
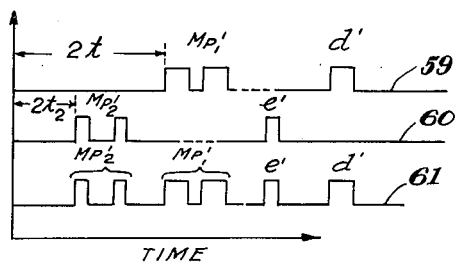
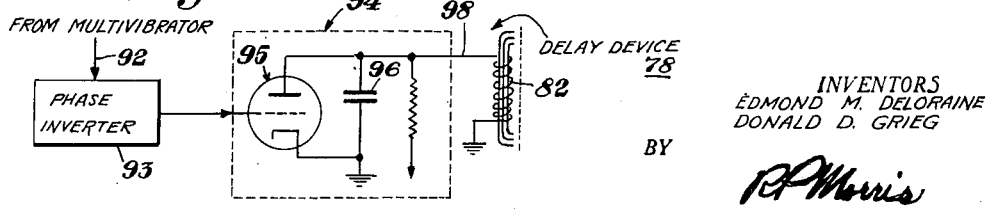
INVENTORS
EDMOND M. DELORAINE
DONALD D. GRIEG
BY
R P Morris
ATTORNEY

INVENTORS
EDMOND M. DELORAINE
DONALD D. GRIEG

BY

R P Morris
ATTORNEY

Patented May 31, 1949

2,471,416

UNITED STATES PATENT OFFICE 2,471,416

RADIO COMMUNICATING SYSTEM

Edmond M. Deloraine, Paris, France, and Donald D. Grieg, Forest Hills, N. Y., assignors to Federal Telephone and Radio Corporation, New York, N. Y., a corporation of Delaware Application March 28, 1946, Serial No. 657,710

9 Claims. (Cl. 250—9)

This invention relates to a radio multichannel communicating system for mobile stations such as those carried on vehicles, such as aircraft, ships, railroad trains, automobiles, buses, etc., following a predetermined route. More particularly, it deals with a system having a chain of relay or repeater stations along a route between two terminals and means in each relay station for automatically inserting signals from the mobile stations at a given time position on a multichannel electromagnetic wave transmitted along said route between the terminals and through the repeater stations. This invention is an improvement of the system described in the copending application of Deloraine, Serial No. 531,851, filed April 20, 1944.

It is an object of this invention to communicate with mobile stations along a fixed route in a novel and effective manner.

Another object is to continuously and simultaneously communicate with a plurality of mobile stations along a given route.

Another object is to produce a multichannel signal pulse modulated electromagnetic wave for transmission along the route wherein definite channels are reserved for communication with different mobile stations along the route.

Another object is to relay a multichannel signal pulse modulated electromagnetic wave along a route and transmit and receive different channels at different repeater stations along the route.

Another object is automatically to insert signals received from vehicles at repeater stations along the route in pre-selected channels on a multichannel signal pulse electromagnetic wave which is transmitted through repeater stations along a route.

Another object is to insert signals, from a vehicle traveling along a route regardless of the position of the vehicle in a definite time position on a given multichannel pulse modulated electromagnetic wave without demodulating and remodulating the signals received from the vehicle.

Another object is to produce a multichannel signal pulse modulated wave in which different channels on said wave have given time spacings and to insert different channels in selected spacings on said wave during its transmission along a route.

Another object is to segregate selected channels on a multichannel pulse modulated electromagnetic wave for reception by vehicles traveling along a fixed route.

Another object is to provide means on vehicles for selecting a given time spaced channel on a multichannel pulse modulated electromagnetic wave transmitted along a fixed route for communication between said vehicles and given points along said route.

Another object is to provide repeater stations for a multichannel pulse modulated electromagnetic wave which is transmitted along a given route which stations also transmit and receive all or a part of said wave to adjacent vehicles along said route.

Another object is to provide a continuous communication channel between a given point along a route and each vehicle along a said route.

Another object is to maintain continuous communication between the operators of vehicles along a route and a dispatcher at a fixed station, for communicating intelligence such as telegraphic, telephone, and/or facsimile signals.

Still other objects and features will appear from time to time in the description which follows:

Generally speaking, the multichannel communication system of this invention for communication with mobile stations such as on vehicles along a relatively fixed route comprises: (1) a main station (hereinafter referred to as the west terminal), (2) means for transmitting the electromagnetic wave generated at the main terminal including a chain of repeater or relay stations along said route for repeating the wave both to the next repeater station and at least a portion of the wave to vehicles adjacent said stations; (3) means on at least one of the vehicles along the route for receiving signals from an adjacent repeater station and transmitting signals to that station controlled in time with respect to the signal received from that station; and (4) means in said repeater station for receiving the signals from the vehicles and preventing their interference with other signals received by and/or passing through any repeater stations.

The main station or west terminal includes means for modulating and interleaving trains of pulses on an electromagnetic wave in accordance with different signals and transmitting these pulses, either directly if they have a sufficient frequency of themselves or on a suitable radio frequency carrier wave, along a fixed route through the chain of repeater stations to the other or east terminal. The west terminal also includes means for receiving a multichannel pulse modulated electromagnetic wave from the same or another chain of repeater stations, initiated or returned from the east terminal, and separating and demodulating the different channels of signal energy thereon.

The two terminals including the chain of repeater stations may be connected by radio links which may include directional or line-of-sight transmitting and receiving antennas between each of the repeater stations or they may be connected by a transmission line such as a coaxial cable for transmitting high frequency waves.

The repeater stations should not only be equipped to receive and transmit the multichannel wave along the route to the next adjacent repeater station in one or both directions, but also to transmit signals to adjacent vehicles along the route as well as to received signals from those vehicles. In order to prevent interference between two adjacent repeater stations the signals transmitting therefrom may preferably have directivity such as transmission and reception only in one semi-circular area of 180° perpendicular to the route. Each repeater station is provided with separate transmitter and receiver circuits for the wave traveling from the west terminal and for the wave traveling from the east terminal. If desired, the wave traveling from one or both terminals may be completely or partially transmitted to the vehicles from each repeater. The wave from the west terminal may be all or partly transmitted to the vehicles, and wave from the east terminal may contain time spaces for signals received from the vehicles. In this case the marker or synchronizing pulses on the wave from the east terminal should be transmitted by the repeater so that the signals from the vehicle may be synchronized and inserted in the proper spaces on this wave. On the other hand, the wave traveling in one direction may carry signals both for transmission to the vehicles as well as time spaces for pulse modulated signals transmitted from the vehicles while the multichannel wave traveling in the opposite direction from the other terminal may not be transmitted from any of the repeater stations to any vehicles along the route but merely act as a return for the multichannel wave transmitted from the main station.

Each of the vehicles along the route, in order to take advantage of the communication system of this invention, should be provided with a suitable radio transmitter and receiver for receiving the signals from the nearest repeater station and a transmitter for transmitting its own signals back to that station. In the first aforementioned system, wherein all of the multichannel wave traveling in one direction is transmitted to the vehicles and only the synchronizing pulses of the wave traveling in the other direction are transmitted, there may be provided a separate means for receiving the synchronizing pulses. Each vehicle is assigned a definite time space channel on the multichannel wave traveling toward the main terminal, which space has a definite time relation to the position of marker pulses on that wave. Therefore, each vehicle is provided with means for synchronizing its transmitted signals in timed relation to the received marker pulses so that when it is fitted at the repeater terminal on the main returning multichannel wave the signal from the vehicle will fall in the position reserved for that vehicle, and not interfere with other signal channels on that wave. To insure proper fitting or placement of the vehicle transmitted signal on the main multichannel wave, the marker or synchronizing pulse transmitted from that wave to the vehicle is again transmitted with the signal from the vehicle in the pre-selected or assigned proper time spaced relationship. Furthermore, in order to prevent interference between signals from two or more vehicles transmitting to the same repeater station, the signals from each vehicle should have a different identifying characteristic, such as the shape or width of their pulses or the frequency of the carrier waves therefor.

Each repeater station is provided with means for selecting the signals from the different vehicles and automatically and continuously measuring their distances by means of the delay of the transmitted and again received marker pulses, so that the signals transmitted from the vehicles will be adjustably delayed regardless of their distance or change in their distance from that repeater station. Each repeater station is also provided with separate inserter circuits for each one of the vehicles which may transmit signals to it as it travels along the route, since each vehicle has a different assigned timed space position or channel on the multichannel pulse wave. Thus, different delayed constants in the inserter circuits are provided corresponding to the time space channel from the marker reserved for each vehicle.

While this invention itself is defined in the appended claims, the foregoing and other features and objects of the invention will become more apparent and the invention best understood upon consideration of the following detailed description of an embodiment of the invention to be read in connection with the accompanying drawings, in which:

Fig. 1 is a schematic block diagram of the multichannel communication system of this invention showing the stations and terminals along a route;

Fig. 4 is a schematic block wiring diagram of the circuits for a vehicle traveling along the route of Fig. 1;

Fig. 5 is a graph of wave forms useful in explaining the modification of the vehicle selector circuits shown in Fig. 2;

Fig. 6 is a schematic wiring diagram of a modification of the distance measuring circuit shown in Fig. 2.

Figure 2:
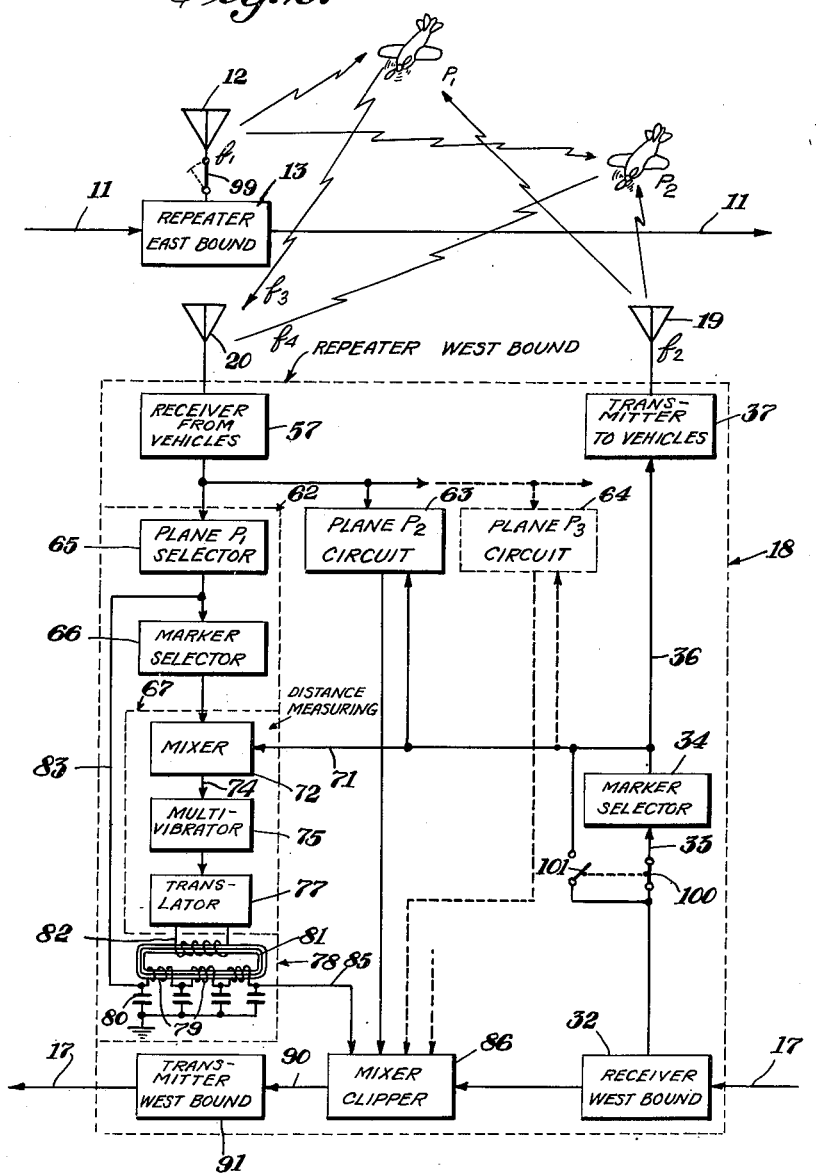
Fig. 2 is a schematic block wiring diagram of one of the repeater stations shown in Fig. 1.

For convenience, the description is defined into the following chapters: Chapter I—The route system; Chapter II—The vehicle circuits; Chapter III—The repeater circuits; and Chapter IV—A modified system.

CHAPTER I

*The route system*

Fig. 1 shows the essential stations located along a route for communicating with vehicles traveling along that route according to this invention. At each end of the route there is located a terminal station, one of which may be a master or main terminal station, which in this case is the west terminal 1. At the other end of the route is the east terminal station 2 which may be also a master station or may merely return the signals transmitted to it along the route back to the west terminal 1. In between the two terminals are provided repeater stations 3 located at suitable distances along the route both for relaying signals along the route in each direction toward each terminal, as well as for relaying the signals to vehicles within their range.

The link means or medium for transmission of the signals between terminals 1 and 2 and through repeater stations 3 may be by radio or cable. If radio is employed the repeater antennas may have directivity so that their signals will not be confused with the signals transmitted and received from the vehicles along the route. For this case an ultra-high frequency wave, that is, a line-of-sight wave may be used and the repeater stations may be placed on high ground or towers, say every 20 or 30 miles apart.

The terminals also may be provided with circuits similar to those employed in the repeater stations for transmitting and receiving signals from vehicles closest to them.

Figure 3:
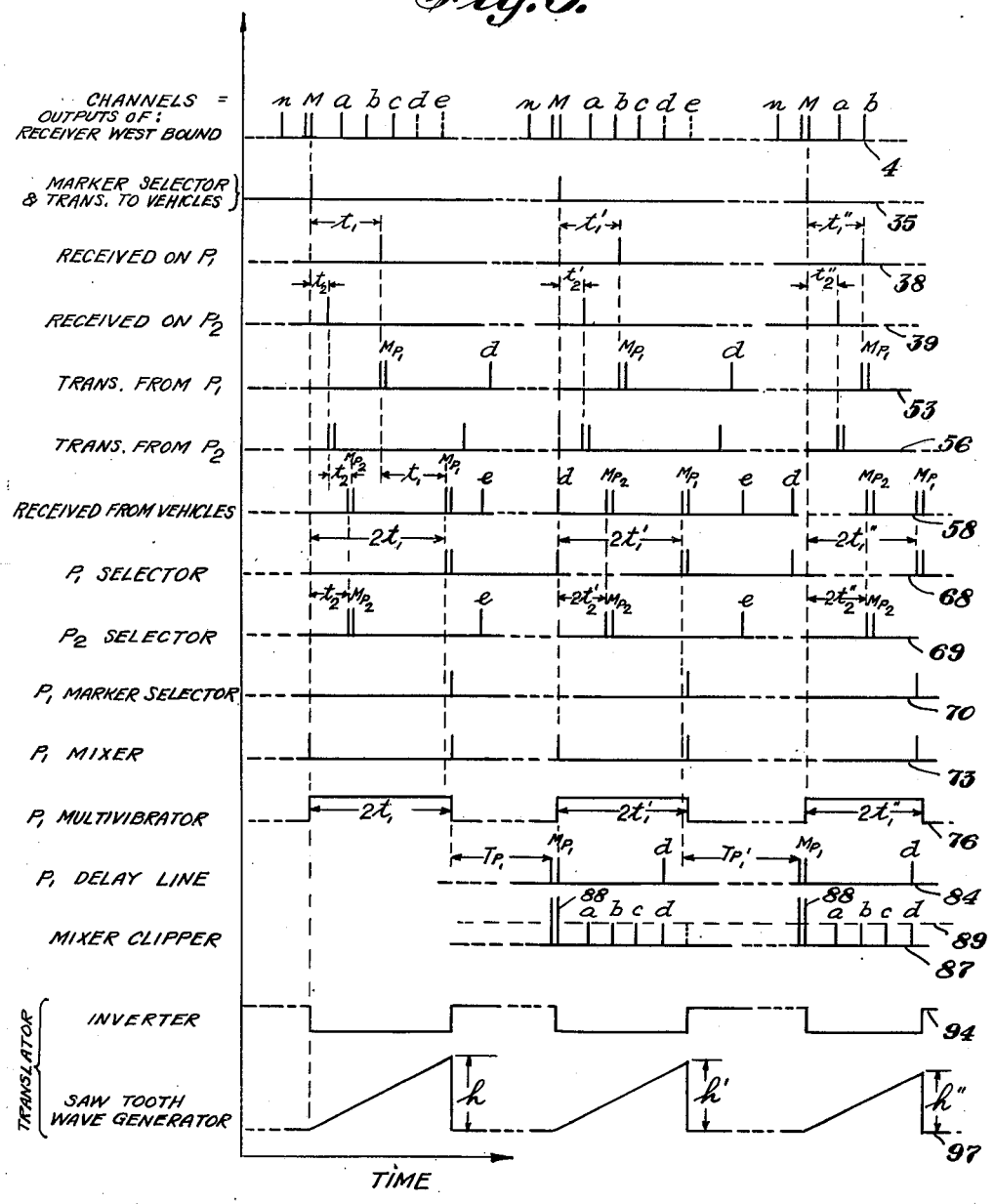
Fig. 3 is a graph of wave forms useful in explaining the operation of the circuits in Figs. 2 and 6.

As previously mentioned, the signals transmitted along the route are modulated on pulses to form trains of pulse modulated signals, which trains are interleaved on a single wave with marker or synchronizing pulses similar to wave 4 shown in Fig. 3. Here the different channels $a$, $b$, $c$ . . . form a group of pulses which have definite time spaced relationships with respect to the interleaved marker pulses M. Such a wave 4 may have unoccupied channel spaces, such as for signals $d$ and $e$, from vehicles along the route. The different signal channels $a$, $b$, $c$, may be directly induced in the pulse modulator circuits 5 or may be passed through a suitable switchboard 6, which may be connected to other signals received from points along the route or from outside sources to lines 7. The resulting multichannel electro-magnetic pulse modulated wave 4 produced in the circuits 5 may be withdrawn through line 8 into a transmitter 10 for transmission along the route over suitable link medium or means 11 passing through repeater stations 3 to the east terminal 2. If the frequency components of the multi-channel pulse wave 4 are sufficiently high the modulation of the pulses 4 on a carrier wave of higher frequency is not necessary for their transmission. However, throughout this and particularly other parts of the system it is desirable to employ radio carrier waves of different frequencies for the signals traveling in different directions as well as for the signals transmitted and received in the repeater stations.

The repeater stations 3 may comprise suitable radio antennas 12 for transmitting the signals received over means 11 directly to the vehicles along the route. This may be accomplished in a suitable east bound repeater circuit 13 (Fig. 2) from which the incoming wave 4 is transmitted to vehicles, such as airplanes P—1 and P—2 on the same or a different frequency carrier wave as that received from the west terminal 1 through line 11. The circuit 13 also amplifies the multichannel pulse wave 4 before transmitting it on through the line 11 to the next station along the route.

The east terminal 2 may comprise a receiver 14 which is directly coupled through line 15 to a transmitter 16 for transmitting the same wave 4 back along the route over a suitable link means 17 (similar to 11) through the same repeater stations 3. The east terminal 2 may comprise also complete modulator and demodulator circuits similar to those shown in the west terminal 1, and may be connected with signals from outside sources (not shown).

It is desirable that means 17 be separate from means 11, such as a different carrier wave frequency from that produced in transmitter 10 in the west terminal, so that separation may be made between the waves passed in each direction by the vehicles along the route. However, in the modified system described later in Chapter IV, separate frequencies are not necessary provided the paths of link means 11 and 17 are separate such as two coaxial cables.

For convenience in the description of this embodiment of the invention the frequency of the east terminal carrier wave will be referred to as $f_1$ and that of the west terminal carrier wave will be referred to as $f_2$. In order to distinguish the signals received from the airplanes P—1 and P—2, they transmit signals in still different frequencies $f_3$ and $f_4$ (as shown in Fig. 2) which are received at repeaters 3 on antennas 20 coupled to the westbound repeater circuits 18.

The returning or westbound multichannel pulse-modulated wave 4 from transmitter 16 through medium 17 is passed through a suitable westbound repeater circuit 18 (in Fig. 2) in each repeater station 3. This received wave of different frequency $f_2$ may be all or partially transmitted from the repeater 18 through antenna 19 to the vehicles but preferably only the synchronizing or marker pulses M are transmitted. The transmission of these synchronizing pulses is for quasi-radar purposes to measure the distance between that repeater station and the vehicle in its vicinity transmitting to that repeater, for operation of the inserter circuits later described and comprising part of the westbound repeater circuit 18. The signals received from the vehicles are automatically delayed and inserted in the vacant channel spaces $d$ and $e$ on wave 4 before the resulting westbound multichannel wave is transmitted on toward the west terminal through medium 17.

The resulting multichannel wave from the east terminal and repeater 3 is received at the west terminal 1 in a suitable demodulator circuit 22 from which the signals $d$ and $e$ from airplanes P—1 and P—2 may be demodulated and passed through the switchboard 6.

The modulation and demodulation of signals on pulses according to the system of this invention may be with respect to time or amplitude. Suitable systems for time modulation and demodulation are described in the copending applications of: E. M. Deloraine and N. H. Young, Ser. No. 504,204, Sept. 29, 1943; E. M. Deloraine and J. L. Fearing, Ser. No. 506,802, Oct. 19, 1943, Patent No. 2,429,613, dated Oct. 28, 1947; D. D. Greig, Ser. No. 536,301, May 19, 1944; D. D. Greig, Ser. No. 539,856, June 12, 1944, Patent No. 2,424,977, dated Aug. 5, 1947; D. D. Greig, Ser. No. 625,650, Oct. 30, 1945; E. Labin et al., Ser. No. 591,065, Apr. 30, 1945, Patent No. 2,429,631, dated October 28, 1947, and E. Labin et al., Ser. No. 565,152, Nov. 25, 1944, Patent No. 2,465,380, dated March 29, 1949.

CHAPTER II

*The vehicle circuits*

Each vehicle, in order to make full use of the advantages of this system, should be provided with a receiver and a transmitter circuit similar to that shown in Fig. 4. For this embodiment, the $f_1$ eastbound multichannel wave transmitted from antennas 12 of the stations 3 is received over antenna 23 and coupled to a suitable receiver 24 from which is withdrawn the wave 4 through line 25 into the marker pulse selector circuit 26 (similar to that shown in copending application of D. D. Greig, Ser. No. 625,650, filed October 30, 1945) for separating the marker pulses M from the other pulses on the wave 4. These separated marker pulses are then passed into the suitable wave generator 27 for producing a base wave which is then passed into a suitable delay device, 28, which may in the case of a sine wave be a phase shifter, for delaying the wave an amount corresponding at the time interval channel to be selected by the vehicle, such as $a$, $b$, $c$, etc., indicated by the contacts 29. (If desired, additional delay devices may be employed on each vehicle for simultaneously selecting additional channels communicated thereto.) The resulting delayed wave in device 28 is then passed into a suitable pulse demodulator circuit 9 which is also connected through line 30 to the wave 4 from receiver 24. The delayed wave in circuit 9 deblocks the selected channel of pulse-modulated signals so it may be demodulated, are withdrawn through line 21, as, say, signal $a$.

In the present described embodiment, there also may be provided on the vehicle a second receiver for the synchronizing pulses from the westbound multichannel wave for the purpose of both synchronizing the channel or channels transmitted on the vehicle as well as continually measuring the distance to that vehicle. Referring back to Fig. 2, the transmission of the marker pulses M from the westbound wave may be accomplished by receiving the westbound wave in a suitable receiver 32 and passing the wave through the line 33 to a suitable marker selector 34 (similar to selector 26 in Fig. 4) and then passing the selected marker pulses (shown on wave 35 in Fig. 3) through line 36 to a suitable transmitter 37 coupled to the antenna 19. The frequency of this transmitter may be the same as that of the westbound multichannel wave, namely frequency $f_2$.

Due to the distance between the plane P—1 and the repeater station transmitting the marker pulse wave 35, the pulses on the wave 35 are delayed in time as shown by the wave 38 in Fig. 3. For illustration, it is assumed that the plane P—1 is farther away from the nearest repeater station than the plane P—2, and that the plane P—1 is traveling in the direction toward that repeater station while the plane P—2 is traveling away from the repeater station. Thus, successive pulses received by the plane P—1 will be delayed in time less and less as the plane approaches. This is graphically represented on wave 38 by showing the first marker pulse received from the wave 35 delayed a time $t_1$ while a later marker pulse is delayed a time $t_1'$ less than the time $t_1$. Similarly, a still later pulse is delayed a still less time $t_1''$ which is less than $t_1'$. For plane P—2, which is closer to the repeater station than plane P—1 but is traveling away from the repeater station, the marker pulse from antenna 19 will be delayed only in time $t_2$ (shown on the wave 39 in Fig. 3) while a later pulse will be delayed a time $t_2'$ and a still later pulse a time $t_2''$, wherein $t_2''$ is greater than $t_2'$ is greater than $t_2$.

Referring back to Fig. 4 and assuming that the circuit is on the plane P—1, the wave 38 may be received over antenna 40 coupled to $f_2$, receiver 41 and thence passed to a wave generator 42 through line 43. If desired, one receiver and antenna may be employed for receiving both waves $f_1$ and $f_2$, if it is tuned to sufficiently wide frequency range, and the resulting received signals may be separated in filters (not shown). The resulting received pulse wave 38 produces in generator 42 a suitable modulating wave which may be delayed in the device 44 (similar to device 28), but it is delayed in time corresponding to the channel selected for the plane P—1, in this case channel $d$ of contacts 45. The thus delayed wave is then passed through line 46 to a suitable pulse modulated circuit 47 upon which the signal $d$, introduced to line 48, is pulse modulated to produce a train of pulses $d$ spaced in time from the marker pulses on wave 38 a distance according to the distance between the marker pulse M and the vacant channel space $d$ on wave 4. The resulting train of pulses $d$ is passed through line 49 into a mixer 50 where it is mixed with a train of marker pulses $M_{P1}$ produced in the marker pulse generator 51 controlled through line 52 by the received pulse wave 38. From the mixer 50 is then withdrawn the wave 53 (Fig. 3) which is then passed to transmitter 54, preferably operating at a different frequency than any of the others previously mentioned, such as frequency of $f_3$. The wave 53 is then returned from the antenna 55 back to the repeater station and received on antenna 20 the pulses on which are further delayed in time according to the times $t_1$, $t_1'$ and $t_1''$ previously mentioned.

Similarly, the marker pulses from the antenna 19 of the repeater station are received in delayed times $t_2$, $t_2'$ and $t_2''$ as shown on wave 39 at the airplane P—2 and are thus passed through the left portion of circuit shown in Fig. 4 to produce a train of channel pulses $e$ and marker pulses $M_{P2}$ which are mixed to produce the wave 56. Channel $e$, being the channel reserved for plane P—2, is selected in the device 44 by adjusting it to contact 45 corresponding to channel $e$ to delay the pulses $e$ with respect to the marker pulses $M_{P2}$ in time corresponding to the time spacing between marker pulse M and space $e$ on wave 4.

The receiver 57, in the westbound repeater circuit 18, coupled to antenna 20 thus detects pulses from both planes P—1 and P—2 to produce the pulse wave 58 shown in Fig. 3, which is a mixture of wave 53 and 56 delayed respectively in times $2t_1$, $2t_1'$, $2t_1''$, and $2t_2$, $2t_2'$, $2t_2''$.

In order to prevent confusion and in order to identify the different vehicles the waves 53 and 56 transmitted from the vehicles, their identifying characteristics instead of being their different carrier frequencies $f_3$ and $f_4$ may be in the width of their pulses, such as shown in the graph in Fig. 5. Herein the pulses from plane P—1 are shown to have a greater width than those from plane P—2, waves 59, 60 and 61 corresponding to the waves 53, 56 and 58 in Fig. 3, respectively. The references to the pulses shown in Fig. 5 are primed so that they may be compared with the reference characters to the pulses shown in Fig. 3.

The pulse demodulator and modulator circuits shown in Fig. 4 may be similar to the circuits 5 and 22 mentioned in Fig. 1 or similar to those disclosed in the above mentioned copending application of E. M. Deloraine, Ser. No. 531,851, filed April 20, 1944.

CHAPTER III

*The repeater circuits*

Referring now to the automatic inserter circuits 62, 63, 64, etc., in the westbound repeater station, circuits 18 shown in Fig. 2, a separate inserter circuit is provided for each of the vehicles traveling along the route, P—1, P—2, etc., respectively. Each of these inserter circuits includes a vehicle or plane selector circuit 65, a marker selector circuit 66 (similar to 26 in Fig. 4), and a distance measuring circuit 67.

The vehicle selector circuits 65 may comprise filters to separate the different carrier frequencies corresponding to the different vehicles. For example, plane P—1 transmits the wave 53 on a carrier frequency $f_3$, a selector 65 may comprise a filter for passing only pulses modulated on the $f_3$ frequency wave. If the pulses from plane P—1 have a given width characteristic as shown on wave 59 in Fig. 5, the selector 65 may comprise a width selector circuit similar to that described and shown in Fig. 8 in the copending application of E. M. Deloraine, Serial No. 531,851, mentioned above.

The resulting selected pulse waves corresponding to planes P—1 and P—2 are shown as waves 68 and 69 respectively in Fig. 3 wherein each of the pulses are delayed twice the time they are delayed in waves 38 and 39 above, since they have now traversed twice the distance between the planes and the repeater station. As shown in waves 68 and 69, the pulse trains are out of phase with the wave 4 and they must be relatively advanced or delayed so that the marker pulses $M_{P1}$ and $M_{P2}$ will superimpose with the marker pulses M on the wave 4. This is automatically accomplished in the distance measuring circuit 67. The marker pulses $M_{P1}$ and $M_{P2}$ from waves 68 and 69, are separately selected in circuits 66 so that they may be compared with the marker pulses transmitted from the westbound wave 4 separated in selector 34 and transmitted to the vehicle from antenna 19.

Referring specifically to the pulse inserter circuit 62 for plane P—1, the wave 70 is withdrawn from the marker selector 66 comprising pulses corresponding to marker pulses $M_{P1}$ on wave 68. This distance or time delay between them and marker pulses on wave 35 is obtained by mixing the pulse wave 35 from selector 34 through line 71 in the mixer 72 (of the distance measuring circuit 67) with wave 70 from selector 66 to produce the wave 73. This wave 73 is withdrawn through line 74 for triggering a suitable multivibrator or similar trigger circuit 75 to produce the wave 76. The positive pulses on the wave 76 correspond in width to the different distances of the plane P—1 from the repeater station at different times.

If wave 76 were passed through a suitable translator circuit 77, which may comprise a filter or a generator to produce waves of different amplitudes corresponding to the width of the pulses 76, a change in the flow of energy can be obtained corresponding to the change in distance of the plane P—1 from the repeater station. This change in energy may be passed through a suitable means for variably changing the delay caused by passing the signal pulses received from P—1 through an artificial delay line 78 comprising a network of inductances 79 and condensers 80. The inductances 79 may be connected through a suitable magnetic core 81 through which the relative change in energy corresponding to the change in width of pulses on wave 76 may be applied, either directly or through a suitable induction coil 82 connected to the translator 77. Thus, the change in energy in the coil 82 will change the value of the inductances 79 and correspondingly change the amount of delay of the pulse wave 68 from selector 65 as it is passed through line 83 to the delay network 78. From the network 78 is withdrawn the properly delayed pulse wave 84 upon which the marker pulses $M_{P1}$ and delayed times $T_{P1}$ and $T'_{P1}$, so as to coincide with the marker pulses M on wave 4, The resulting wave 84 is passed through line 85 into a suitable mixer-clipper 86 in which is produced the wave 87 composed of waves 84 and wave 4 from receiver 32. The tubes (not shown) of the mixer clipper 86 may be biased to clip a double amplitude marker pulse 88 from the wave 87 above the line 89, so that only the pulses occurring below the line 89 on wave 87 will be passed from the mixer-clipper 86 through the line 90 to the westbound transmitter 91. This transmitter may operate the same frequency $f_2$ as the wave receiver in circuit 32, and it may transmit the wave 4 now containing the pulse modulated signals from plane P—1, on to the west terminal 1.

Instead of a filter translator 77 operating according to energy in the variable width pulses or wave 76, a circuit may be provided similar to that shown in Fig. 6 wherein the wave 76 is introduced through line 92 into a phase inverter 93 to produce the wave 94 shown in Fig. 3. Wave 94 is then passed into a saw-tooth wave generator circuit 94 comprising a tube 95 and condenser 96 from which circuit is withdrawn the saw-tooth wave 97 through line 98 for connection to the inductance coil 82 of the delay device 78. It should be noted that the amplitudes $h$, $h'$, $h''$ of the saw-tooth pulses on wave 97 correspond respectively to the widths $2t_1$, $2t_1'$, $2t_1''$ on wave 76.

If desired, inserter circuits similar to 62, 63, 64 shown in the repeater stations, may also be provided in either or both terminal circuits so that pulse trains received on the multichannel wave may be directly transmitted again on the outgoing multichannel wave without demodulation and modulation, once their identification and destination is determined by the operator at the terminal. In such a case a manually adjustable delay device could be provided at the terminals, instead of the variable delay device 78 shown in Fig. 2. which would be similar to the delay devices shown at 28 or 44 in Fig. 4.

CHAPTER IV

A modified system

Instead of transmitting all or a portion of both the eastbound and westbound multichannel waves traveling through mediums 11 and 17 in Fig. 1, the multichannel waves traveling only in one direction may be transmitted and have signals from the vehicles inserted thereon, thereby eliminating additional transmitter and receiver circuits 12 and 40 at the repeater and at the vehicle, respectively. In order to change the system of the embodiment above described into a system such as this, the closed switches shown in Figs. 1, 2 and 4 are opened, and correspondingly the open switches are closed.

In the repeater stations 3 the switches 99 are opened so that the wave traveling along the medium 11 will merely be relayed from one repeater station to the other without being transmitted to the vehicle along the route. Also in each repeater station the switch 100 in line 33 is opened and switch 101 is closed to by-pass the marker selector 34 (shown in Fig. 2) so that all of the wave 4 will be transmitted at the vehicle over antenna 19.

On the vehicle the selector marker pulses on the received wave may be employed both for deblocking and demodulation of the selected signal channels to the vehicle, as well as for synchronizing the channel to be transmitted from the vehicle. In this case the vehicle circuit shown in Fig. 4 would have the switch 102 open and the switch 103 closed, so that the selected marker pulses also pass through line 104 to the transmission circuit. This marker pulse would then operate marker pulse generator 51 and may also operate the wave generator 42. However, if desired, only the wave generator 27 may be employed and its output may be connected to both the delay devices 28 and 44 (not shown). The operation of the switches 102 and 103 in Fig. 4 cut out the receiver circuits 40 and 41 which eliminates the necessity of transmitting signals at two different frequencies from the repeaters to all the vehicles along the route.

This system also has the advantage of reducing the number of carrier frequencies required for the same amount of information communicated in the first described embodiment.

Another modification of this system may be similar to that shown in Figs. 13 through 17 in the above mentioned case of E. M. Deloraine, Serial No. 531,851, wherein different width pulses may be provided for different repeater stations or group of repeater stations along the route for transmitting certain channels of signals to certain vehicles and receiving signals from those vehicles for insertion into the same channel spaces along the same transmitted wave as the selected channel signals are transmitted to the vehicles.

While the above is a description of the principles of this invention in connection with specific apparatus it is to be clearly understood that this description is made only by way of example and not as a limitation on the scope of this invention.

We claim:

1. A communication system for mobile stations moving along a route comprising: a main station for transmitting a multichannel electromagnetic pulse wave having given reserved pulse channel positions for the insertion of pulses from said mobile stations, means for transmitting said wave along said route including a chain of repeaters for transmitting at least selected channel pulses of said wave to vehicles along said route and receiving pulse waves including signal modulated pulses from said mobile stations, said repeaters including means operative under the control of said selected channel pulses and said pulse waves from said mobile stations for inserting the signal modulated pulse waves from said mobile stations in said given reserved positions on the original pulse wave transmitted from said main station, and means for returning the resulting multichannel signal modulated pulse wave to said main station.

2. The system of claim 1 wherein said main station includes means for producing marker pulses interleaved at regular intervals along said multi-channel pulse waves and said repeaters include means for transmitting to said mobile stations said marker pulses from at least one of said multichannel pulse waves for automatically measuring the distance between said mobile stations and said repeaters.

3. The system of claim 1 wherein said inserting means in said repeater stations include means for automatically measuring the distance between said repeaters and said vehicles.

4. The system of claim 1 wherein said inserting means in said repeater stations include means for continuously determining the distance between said repeater stations and said vehicles and automatically controlling the amount of delay of the waves received from said vehicles by said determined distances to continuously insert the received waves in the unfilled channel spaces on the original multichannel pulse wave passing through said repeater stations.

5. A system for continuously communicating with vehicles along a route comprising: a main station for producing a multichannel signal pulse-modulated electromagnetic wave having different recurrent time interval spaces therealong for different signal channel pulses and having marker pulses regularly interleaved between similar groups of channel pulses, a chain of repeater stations extending along said route, means for transmitting said wave through said repeater stations and from said repeater stations to said vehicles along said route, means on said vehicles for receiving said wave and separating the marker pulses therefrom, further means on said vehicles for transmitting a channel of pulse-modulated signals controlled in time with respect to said received marker pulses and retransmitting the marker pulses, and means in said repeater stations for receiving the signals, means operative under the control of the marker pulses of the original wave and the retransmitted marker pulses for interleaving said received signals in a given space interval on said wave.

6. The system of claim 5 wherein said interleaving means in said repeater stations include means for automatically measuring the distance between said repeater stations and vehicles by use of said marker pulses.

7. The system of claim 5, where said interleaving means in said repeater stations include means for automatically delaying the received signals from said vehicles in accordance with the distances of said vehicles from said repeater stations.

8. The system of claim 5, wherein said means for producing pulse-modulated signals includes means for time modulating said pulses in accordance with said signals.

9. A multichannel communication system for communicating with vehicles moving along a route comprising: a main station for producing a multichannel-signal pulse-modulated electromagnetic wave having different recurrent time interval spaces therealong for pulses of different signal channels all of which spaces are not filled with pulses and having marker pulses regularly interleaved between similar groups of different signal channel spaces, repeater stations along said route for transmitting said waves both along said route and from said station to vehicles along said route, means on said vehicles for receiving said wave and for transmitting a different signal modulated pulse wave to the repeater stations from which they receive said multichannel wave, said repeater stations including means for receiving said different pulse waves and automatically inserting said different pulse waves in the unfilled spaces on said original multichannel pulse wave, said means on said vehicles including means for transmitting the signal modulated pulse waves therefrom together with the received marker pulses and synchronizing said transmitted different signal modulated pulse waves with said received marker pulses, and said inserting means in said repeater stations including means for selecting said marker pulses from both the received and transmitted waves at said repeater stations in order to measure the distance to said vehicles, and means controlled by the resulting measured distance for inserting the reecived waves from said vehicles in the unfilled channel spaces on the original multichannel pulse wave passing through said repeater stations.

EDMOND M. DELORAINE.
DONALD D. GRIEG.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,155,821 | Goldsmith | Apr. 25, 1939 |
| 2,171,293 | Plastino | Aug. 29, 1939 |
| 2,248,727 | Strobel | July 8, 1941 |
| 2,262,838 | Deloraine et al. | Nov. 18, 1941 |
| 2,406,165 | Schroeder | Aug. 20, 1947 |
| 2,421,017 | Deloraine et al. | May 27, 1947 |
| 2,421,727 | Thompson | June 3, 1947 |

OTHER REFERENCES

Pennsylvania Turnpike, "Electronics," May 1942, pp. 34 to 51. (Copy in 250-15.)